(12) United States Patent
Sulaiman Lo et al.

(10) Patent No.: US 9,029,003 B2
(45) Date of Patent: May 12, 2015

(54) ELECTRODE ASSEMBLY OF LITHIUM SECONDARY BATTERY

(75) Inventors: Angelia Sulaiman Lo, Taipei (TW);
Chun-Wei Su, New Taipei (TW);
Chyi-Ming Leu, Taoyuan County (TW);
Chih-Jen Yang, Taoyuan County (TW);
Chang-Rung Yang, Taiping (TW);
Jen-Chih Lo, Changhua County (TW);
Tzong-Ming Lee, Hsinchu (TW);
Jing-Pin Pan, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 140 days.

(21) Appl. No.: 13/409,966

(22) Filed: Mar. 1, 2012

(65) Prior Publication Data
US 2013/0157126 A1 Jun. 20, 2013

(30) Foreign Application Priority Data

Dec. 14, 2011 (TW) .............................. 100146117 A

(51) Int. Cl.
| | |
|---|---|
| *H01M 2/14* | (2006.01) |
| *H01M 2/16* | (2006.01) |
| *H01M 10/052* | (2010.01) |
| *H01M 2/34* | (2006.01) |
| *H01M 10/42* | (2006.01) |

(52) U.S. Cl.
CPC ............ *H01M 2/1673* (2013.01); *Y02E 60/122* (2013.01); *H01M 10/052* (2013.01); *H01M 2/1653* (2013.01); *H01M 2/1686* (2013.01); *H01M 2/348* (2013.01); *H01M 10/4235* (2013.01)

(58) Field of Classification Search
CPC .............. H01M 2300/0088; H01M 2300/0091
USPC .......................... 429/211, 220, 213, 231, 132
See application file for complete search history.

(56) References Cited

U.S. PATENT DOCUMENTS

| | | | |
|---|---|---|---|
| 6,051,343 A | 4/2000 | Suzuki et al. | |
| 6,544,689 B1 | 4/2003 | Riley et al. | |
| 7,189,478 B2 | 3/2007 | Iijima et al. | |
| 7,745,052 B2 | 6/2010 | Paulsen | |

(Continued)

FOREIGN PATENT DOCUMENTS

| | | |
|---|---|---|
| CN | 101281961 | 10/2008 |
| CN | 101469078 | 7/2009 |

(Continued)

OTHER PUBLICATIONS

Koh et al., "Preparation and Characterization of Porous PVdF-HFP/clay Nanocomposite Membranes," J. Mater. Sci. Technol., 26(7), Jul. 2010, pp. 633-638.

(Continued)

*Primary Examiner* — Stewart Fraser
*Assistant Examiner* — Olatunji Godo

(57) ABSTRACT

Disclosed is an electrode assembly of a lithium secondary battery, including an anode plate, a cathode plate, a separator for separating the anode plate and the cathode plate and conducting lithium ions of an electrolyte, and a composite film disposed between the anode plate and the separator and/or between the cathode plate and the separator. The composite film includes 5 to 95 parts by weight of an inorganic clay and 95 to 5 parts by weight of an organic polymer binder.

6 Claims, 4 Drawing Sheets

(56) References Cited

U.S. PATENT DOCUMENTS

| | | |
|---|---|---|
| 7,985,497 B2 | 7/2011 | Takita et al. |
| 7,988,895 B2 | 8/2011 | Takita et al. |
| 2002/0034689 A1* | 3/2002 | Hoshida et al. ............... 429/254 |
| 2003/0143467 A1* | 7/2003 | Riley et al. ................... 429/304 |
| 2003/0148187 A1 | 8/2003 | Yamaguchi et al. |
| 2005/0100782 A1 | 5/2005 | Iijima et al. |
| 2006/0194117 A1* | 8/2006 | Paulsen ......................... 429/300 |
| 2008/0038631 A1 | 2/2008 | Nakura et al. |
| 2008/0063939 A1 | 3/2008 | Ryu et al. |
| 2008/0090138 A1* | 4/2008 | Vu et al. ........................ 429/129 |
| 2009/0117455 A1 | 5/2009 | Takita et al. |
| 2009/0181300 A1 | 7/2009 | Kim |
| 2009/0226809 A1* | 9/2009 | Vu et al. ........................ 429/220 |
| 2009/0269672 A1 | 10/2009 | Takita et al. |
| 2009/0286155 A1 | 11/2009 | Takehara |
| 2010/0015514 A1 | 1/2010 | Miyagi et al. |
| 2010/0099031 A1 | 4/2010 | Kato et al. |
| 2010/0119956 A1 | 5/2010 | Tokuda et al. |
| 2010/0159314 A1 | 6/2010 | Kim et al. |
| 2010/0323233 A1 | 12/2010 | Hennige et al. |
| 2011/0003205 A1 | 1/2011 | Yura et al. |
| 2011/0003206 A1 | 1/2011 | Yura et al. |
| 2011/0003209 A1 | 1/2011 | Katayama et al. |
| 2011/0159362 A1 | 6/2011 | Wakizaki et al. |

FOREIGN PATENT DOCUMENTS

| | | |
|---|---|---|
| CN | 102148344 | 8/2011 |
| JP | 2008226566 | 9/2008 |
| TW | 472414 | 1/2002 |
| TW | 494595 | 7/2002 |
| TW | 563268 | 11/2003 |
| TW | 586248 | 5/2004 |
| TW | 200637059 | 10/2006 |
| TW | 200708401 | 3/2007 |
| TW | 200713664 | 4/2007 |
| TW | 200720338 | 6/2007 |
| TW | 200724382 | 7/2007 |
| TW | 200726800 | 7/2007 |
| TW | 200728081 | 8/2007 |
| TW | 200740011 | 10/2007 |
| TW | 200831449 | 8/2008 |
| TW | I307106 | 3/2009 |
| TW | I315591 | 10/2009 |
| TW | 201041960 | 12/2010 |
| TW | 201133991 A | 10/2011 |
| WO | WO 01/29915 A2 * | 4/2001 |
| WO | WO 2010147407 A2 * | 12/2010 |

OTHER PUBLICATIONS

Jeong et al., "Closely packed Sio2 nanoparticles/poly(vinylidene fluoride-hexafluoropropylene) layers-coated polyethylene separators for lithium-ion batteries," Journal of Power Souces 196, Aug. 2011, pp. 6716-6722.

Chung et al., "Enhancement of Meltdown Temperature of the Polyethylene Lithium-Ion Battery Separator via Surface Coating with Polymers Having High Thermal Resistance," Industrial & Engineering Chemistry Research, vol. 48, No. 9, 2009, pp. 4346-4351.

Deka et al., "Electrical and electrochemical studies of poly (vinylidene fluoride)-clay nanocomposite gel polymer electrolytes for Li-ion batteries," Journal of Power Sources, 196, Feb. 2011, pp. 1358-1364.

Taiwan Patent Office, Office Action, Patent Application Serial No. 100146117, Nov. 19, 2013, Taiwan.

China Patent Office, Office Action, Patent Application Serial No. 201110456342.0, Aug. 26, 2014, China.

* cited by examiner

ELECTRODE ASSEMBLY OF LITHIUM SECONDARY BATTERY

CROSS REFERENCE TO RELATED APPLICATIONS

This application claims priority of Taiwan Patent Application No. 100146117, filed on Dec. 14, 2011, the entirety of which is incorporated by reference herein.

BACKGROUND

1. Technical Field

The disclosure relates to an electrode assembly of a lithium secondary battery, and in particular relates to a heat insulating film thereof.

2. Related Art

When an internal short-circuit occurs in a conventional lithium battery, much heat is released in a short period of time, such that a polyolefin separator of the battery may melt and become deformed. If the local heat accumulation is not insulated or the internal short-circuit is not terminated, the active material in the lithium battery may decompose to form high pressure gas. In the worst condition, the gas will cause an explosion. Accordingly, international lithium battery factories invest a large wealth of time an effort to solve the safety problem of an internal short-circuit occurring in the lithium battery. The Japan battery factory Panasonic, disclosed a heat-resistance layer (HRL) utilized in a lithium battery. The mechanical strength of the separator is enhanced to avoid internal short-circuit (e.g. positive electrode directly contacting the negative electrode) from occurring, such that battery safety is improved. However, the heat-resistance layer is composed of a high amount of inorganic particles (e.g. $Al_2O_3$) and a low amount of an organic polymer binder, thereby increasing the internal impedance of the lithium battery. In addition, the inorganic particles are easily peeled to lose their protective effect when being used.

Accordingly, a novel material with an impedance lower than that of the conventional battery (containing a heat-resistance layer) while not affecting safety, is still called-for.

SUMMARY

One embodiment of the disclosure provides an electrode assembly of a lithium secondary battery, comprising: an anode plate; a cathode plate; a separator for separating the anode plate and the cathode plate and conducting lithium ions of an electrolyte; and a composite film disposed between the anode plate and the separator and/or between the cathode plate and the separator, wherein the composite film includes 5 to 90 parts by weight of an inorganic clay and 95 to 10 parts by weight of an organic polymer binder.

A detailed disclosure is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
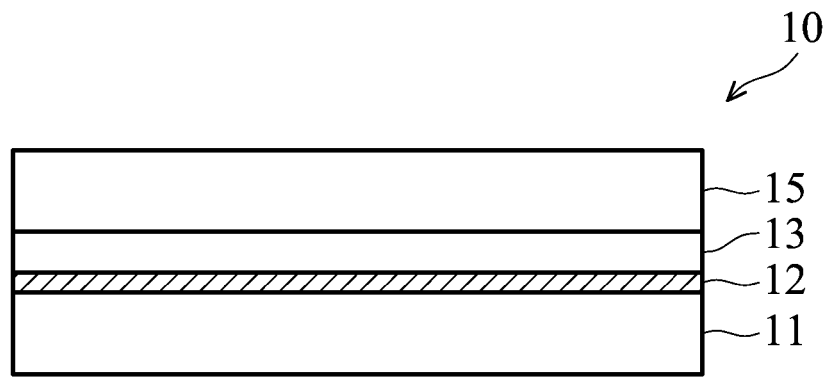
FIGS. 1-3 show electrode assemblies of embodiments in the disclosure.

As shown in FIG. 1, the electrode assembly 10 of a lithium secondary battery includes an anode plate 11, a composite film 12, a separator 13, and a cathode plate 15. The anode plate 11 can be a layered composition of a current collector material such as copper foil or nickel foil, and an electrode active material particle such as natural graphite, artificial graphite, lithium metal, or lithium alloy. The electrode active material particle has a particle diameter of about 5 µm to 25 µm. If the electrode active material particle is too large, the cell capacitance will largely differ to reduce the average capacitance. If the electrode active material particle is too small, the charge/discharge cycle lifetime of the cell will be shortened and the cell capacitance difference will be increased.

The cathode plate 15 can be a layered composition of a current collector material such as aluminum foil, and an electrode active material particle such as lithium cobaltate, lithium manganate, lithium nickelate, lithium vanadate, or lithium nickel cobalt manganese oxide. The electrode active material particle has a particle diameter of about 1 µm to 40 µm. If the electrode active material particle is too large, the cell capacitance will largely differ to reduce the average capacitance. If the electrode active material particle is too small, the charge/discharge cycle lifetime of the cell will be shortened and the cell capacitance difference will be increased.

The separator 13 may conduct the lithium ions of the electrolyte and separate the anode plate 11 and the cathode plate 15. In one embodiment, the separator 13 can be polyolefin such as polyethylene, polypropylene, or copolymers thereof. The suitable polyolefin for the separator 13 should have a porous ratio of about 40% to 95%. A polyolefin having an overly high porous ratio dramatically contracts at high temperatures, such that an internal short-circuit of a cell may occur. A polyolefin having an overly low porous ratio will obstruct the lithium ion conduction and therefore increase the internal impedance of the cell. The polyolefin has a weight average molecular weight of about 1000,000 to 5,000,000. A polyolefin having an overly low weight average molecular weight cannot efficiently separate the anode and cathode due to insufficient mechanical strength. A polyolefin having an overly high weight average molecular weight cannot be efficiently melted and closed to terminate lithium ions conduction when the cell temperature is increased. In addition, the separator 13 has a thickness of about 0.1 µm to 25 µm. An overly thin separator 13 easily causes an internal short-circuit due to insufficient mechanical strength. An overly thick separator 13 will reduce the volumetric energy density of the cell and increase the internal impedance of the cell.

The composite film 12 is critical in the disclosure, which may prevent the anode plate 11 from directly contacting the separator 13. As such, the heat produced by the anode plate 11 will not be directly conducted to the separator 13 to deform the separator 13. As proven in experiments, the electrode assembly 10 having the composite film 13 can be operated at a temperature of over 180° C. without deformation. The composite film 12 includes 5 to 90 parts by weight of an inorganic clay and 95 to 10 parts by weight of an organic polymer binder. In one embodiment, the inorganic clay is a lithium ion exchange inorganic clay, and the organic polymer binder is fluorinated polyethylene. The composite film containing an overly high amount of the inorganic clay (similar to having an overly low amount of the organic polymer binder) easily peels due to insufficient adhesion, thereby losing its protective effect for the cell. The composite film containing an overly low amount of the inorganic clay (similar to having an overly high amount of the organic polymer binder) cannot have enough mechanical strength and may increase the internal impedance of the cell. The composite film 12 has a thickness of 0.1 µm to 10 µm. The cell with an overly thick composite film 12 has poor electrical properties such as reduced cell capacitance. The cell with an overly thin composite film 12 cannot efficiently separate the anode and the cathode, such that an internal short-circuit occurs due to the anode contacting the cathode.

In one embodiment, the lithium ion solution is gradually added to an inorganic clay solution to be stirred and mixed, thereby forming a lithium ion exchange inorganic clay solution. A fluorinated polyethylene such as polyvinylidene fluoride (PVDF) is added to the lithium ion exchange inorganic clay solution to be mixed, thereby forming a composite coating. The composite coating is coated on the anode plate 11, and then bake-dried to form the composite film 12. The coating method includes spin-on coating, blade coating, dip coating, or the likes. The separator 13 and the cathode plate 15 are sequentially stacked on the composite film 12 to form the electrode assembly 10 as shown in FIG. 1. An electrolyte such as a solution of lithium salt dissolved in organic solvent is added into the electrode assembly and then sealed to form a lithium secondary battery.

In another embodiment, the composite coating is coated on one side of the separator 13 and then bake-dried to form the composite film 12. The anode plate 11 is adhered to the composite film 12 on the separator 13, and the cathode plate 15 is adhered to another side (without the composite film coated thereon) of the separator 13 to form the electrode assembly 10 as shown in FIG. 1.

Figure 2:
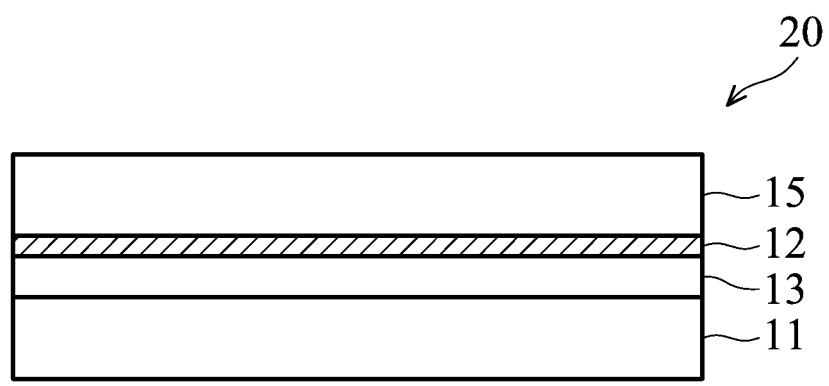

In one embodiment, the composite coating is coated on the cathode plate 15, and then bake-dried to form the composite film 12. The separator 13 and the anode plate 11 are sequentially stacked on the composite film 12 to form the electrode assembly 20 as shown in FIG. 2. An electrolyte such as a solution of lithium salt dissolved in organic solvent is added into the electrode assembly and then sealed to form a lithium secondary battery.

In another embodiment, the composite coating is coated on one side of the separator 13 and then bake-dried to form the composite film 12. The cathode plate 15 is adhered to the composite film 12 on the separator 13, and the anode plate 11 is adhered to another side (without the composite film coated thereon) of the separator 13 to form the electrode assembly 20 as shown in FIG. 2.

Figure 3:
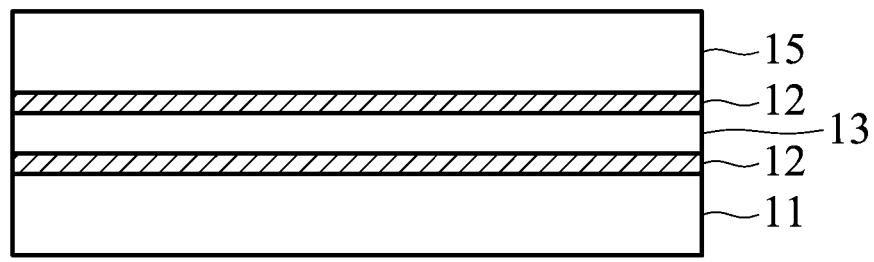

It should be understood that the designs in FIGS. 1 and 2 can be combined to form the electrode assembly as shown in FIG. 3, wherein the composite films 12 are disposed between the anode plate 11 and the separator 13, and between the cathode plate 15 and the separator 13, respectively.

Compared to the conventional art, the organic binder in the composite film may help the inorganic clay to be solidified on the surface of the electrode plate and/or the separator. The solidified inorganic clay makes it difficult for delamination by impact or heat. Meanwhile, the lithium ion exchange clay has better lithium ion conduction than general clay, such that cell electrical properties are not largely influenced by the heat insulative material. In other words, the composite film between the separator and the electrode plate may efficiently avoid the situation where the separator is deformed at high temperatures, and avoid the situation where an internal short-circuit occurs due to the anode plate contacting the cathode plate.

EXAMPLES

Preparation Example 1

Manufacturing a Cathode Plate 91 wt % of LiCoO2 (L106, commercially available from LiCO), 6 wt % of an electrical conductivity enhancer of carbon material (KS-6, commercially available from Timcal), and 3 wt % of a PVDF binder (KF1300, commercially available from Kureha) were averagely mixed with N-methyl-2-pyrrolidone (NMP) to form a cathode slurry. The cathode slurry was coated on an aluminum foil surface, and then dried and pressed to form a cathode plate.

Preparation Example 2

Manufacturing an Anode Plate 95 wt % of MCMB (mesocarbon Micro beads, commercially available from Osaka gas), 1 wt % of an electrical conductivity enhancer of carbon material (Super-P, commercially available from Timcal), and 4 wt % of a PVDF binder (KF1300, commercially available from Kureha) were averagely mixed with N-methyl-2-pyrrolidone (NMP) to form an anode slurry. The anode slurry was coated on a copper foil surface, and then dried and pressed to form an anode plate.

Example 1

Preparing Composite Coatings 25 g of clay (Montmorillonite clay commercially available from Southern clay, clay size<0.5 µm) was dissolved in 1000 g of de-ionized water, and the clay solution was de-ionized by an ion exchange resin. 1000 g of isopropyl alcohol was added to the de-ionized clay solution, and the solution was vacuum distillated at room temperature to form a 2.5 wt % clay solution of isopropyl alcohol. 287.5 g of dimethylacetamide (DMAc) was added to the clay solution of isopropyl alcohol, and the solution was then vacuum distillated at 30° C. to 40° C. to form a 4.3 wt % clay solution of DMAc.

180 g of a polyvinylidene fluoride (PVDF, KF1300 commercially available from Kureha) was dissolved in 820 g of DMAc to be stirred at room temperature, thereby forming an 18 wt % PVDF solution of DMAc.

3.86 g of a lithium salt solution (0.1 wt % $LiOH.H_2O$) was gradually added to 100 g of the clay solution of DMAc to be averagely stirred for 30 minutes to form a lithium ion exchange clay solution. 300 g of DMAc and 56.13 g of a PVDF solution of DMAc were sequentially added to the lithium ion exchange clay solution to be averagely mixed, and the mixture was supersonic vibrated for 1 hour to form a composite coating. The composite coating had a solid content of 3.0 wt %, wherein the lithium ion exchange clay and the PVDF had a weight ratio of 30:70.

3.86 g of a lithium salt solution (0.1 wt % $LiOH.H_2O$) was gradually added to 100 g of the clay solution of DMAc to be averagely stirred for 30 minutes to form a lithium ion exchange clay solution. 70 g of DMAc and 56.13 g of a PVDF solution of DMAc were sequentially added to the lithium ion exchange clay solution to be averagely mixed, and the mixture was supersonic vibrated for 1 hour to form a composite coating. The composite coating had a solid content of 5.7 wt %, wherein the lithium ion exchange clay and the PVDF had a weight ratio of 30:70.

3.86 g of a lithium salt solution (0.1 wt % $LiOH.H_2O$) was gradually added to 100 g of the clay solution of DMAc to be averagely stirred for 30 minutes to form a lithium ion exchange clay solution. 24.62 g of DMAc and 56.13 g of a PVDF solution of DMAc were sequentially added to the lithium ion exchange clay solution to be averagely mixed, and the mixture was supersonic vibrated for 1 hour to form a composite coating. The composite coating had a solid content of 8.0 wt %, wherein the lithium ion exchange clay and the PVDF had a weight ratio of 30:70.

3.86 g of a lithium salt solution (0.1 wt % $LiOH.H_2O$) was gradually added to 100 g of the clay solution of DMAc to be averagely stirred for 30 minutes to form a lithium ion exchange clay solution. 340 g of DMAc and 6.01 g of a PVDF solution of DMAc were sequentially added to the lithium ion exchange clay solution to be averagely mixed, and the mixture was supersonic vibrated for 1 hour to form a composite coating. The composite coating had a solid content of 1.2 wt %, wherein the lithium ion exchange clay and the PVDF had a weight ratio of 80:20.

Example 2

Preparing a Composite Coating 25 g of clay (Montmorillonite clay commercially available from Southern clay, clay size<0.5 μm) was dissolved in 1000 g of de-ionized water, and the clay solution was de-ionized by an ion exchange resin. 1000 g of isopropyl alcohol was added to the de-ionized clay solution, and the solution was vacuum distillated at room temperature to form a 2.5 wt % clay solution of isopropyl alcohol. 287.5 g of dimethylacetamide (DMAc) was added to the clay solution of isopropyl alcohol, and the solution was then vacuum distillated at 30° C. to 40° C. to form a 4.3 wt % clay solution of DMAc.

100 g of a polyvinylidene fluoride (PVDF, KF1300 commercially available from Kureha) was dissolved in 900 g of DMAc to be stirred at room temperature, thereby forming a 10 wt % PVDF solution of DMAc.

5 g of DMAc and 10 g of a PVDF solution of DMAc were sequentially added to the clay solution to be averagely mixed, and the mixture was supersonic vibrated for 1 hour to form a composite coating. The composite coating had a solid content of 8.3 wt %, wherein the clay and the PVDF had a weight ratio of 20:80.

Comparative Example 1

The anode plate, the cathode plate, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.09Ω. The thin cell was formatted by charge/discharge cycles of 0.1 C/0.1 C to measure its electrical properties and irreversible capacitance, as tabulated in Table 1. The thin cell had a poorer performance with a higher irreversible capacitance in the first and second charge/discharge cycles, and the thin cell had a better performance with a higher charge capacitance in the third charge.

TABLE 1

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 19.6% | −1.1% | 132.76 |
| $2^{nd}$ experiment | 18.8% | −0.8% | 133.07 |
| $3^{rd}$ experiment | 19.5% | 0.0% | 133.48 |
| Average | 19.3% | −0.6% | 133.10 |

Example 3

The 10 wt % PVDF solution of DMAc in Example 2 was blade coated by a blade distance of 400 μm, thereby forming a thin PVDF film having a thickness of 20 μm.

The anode plate, the cathode plate, and the thin PVDF film having a thickness of 20 μm were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 235Ω.

Example 4

The composite coating having a solid content of 8.3 wt % in Example 2 (the clay and the PVDF had a weight ratio of 20:80) was blade coated by a blade distance of 400 μm, thereby forming a composite film having a thickness of 20 μm.

The anode plate, the cathode plate, and the composite film having a thickness of 20 μm (the clay and the PVDF had a weight ratio of 20:80) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 105Ω.

Example 5

The composite coating having a solid content of 8.3 wt % in Example 2 (the clay and the PVDF had a weight ratio of 20:80) was blade coated by a blade distance of 100 μm, thereby forming a composite film having a thickness of 5 μm.

The anode plate, the cathode plate, and the composite film having a thickness of 5 μm (the clay and the PVDF had a weight ratio of 20:80) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 62Ω.

As the comparisons between Comparative Example 1 and Examples 3-5 show, the separator film replaced by the composite film formed by blade coating largely increased cell impedance. The commercially available PE separator film (having a thickness of 20 μm) served as standard, and the thin cell including the PE separator had an average cell impedance of about 1.09Ω. The thin cell including the PVDF film (having a thickness of 20 μm) without any inorganic particles had a high cell impedance of 235Ω. The thin cell including the PVDF/clay composite film (having a thickness of 20 μm) had a cell impedance of 105Ω. Accordingly, the clay having negative charges may accelerate the lithium salt dissociation and attract lithium ions of the lithium salt. The attraction between the lithium ions and anions of the lithium salt was reduced to enhance freedom of the lithium ions, thereby enhancing the electrolyte conductivity. When the composite film thickness was reduced to 5 μm, the cell impedance was reduced to 62Ω. As shown as above, the film thickness was positively correlated with the cell impedance.

The composite film formed by blade coating had problems such as being difficult to be baked and non-average thickness due to an uneven surface. The composite films in the following Examples were formed by dip coating, such that the composite films had an average thickness of less than 5 μm to reduce the cell impedance.

Example 6

The composite coating having a solid content of 3.0 wt % in Example 1 (the lithium ion exchange clay and the PVDF had a weight ratio of 30:70) was dip coated on the cathode plate, and then baked at 140° C. for 30 minutes to form a composite film having a thickness of less than 0.1 μm.

The anode plate, the cathode plate with the composite film coated thereon, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.16Ω. The thin cell was formatted by charge/discharge cycles of 0.1 C/0.1 C to measure its electrical properties and irreversible capacitance, as tabulated in Table 2. The thin cell had a poorer performance with a higher irreversible capacitance in the first and second charge/discharge cycles, and the thin cell had a better performance with a higher charge capacitance in the third charge.

TABLE 2

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 13.4% | 1.4% | 143.53 |
| $2^{nd}$ experiment | 8.6% | 7.3% | 138.70 |
| $3^{rd}$ experiment | 12.2% | 2.2% | 142.38 |
| Average | 11.4% | 3.7% | 141.54 |

Example 7

The composite coating having a solid content of 5.7 wt % in Example 1 (the lithium ion exchange clay and the PVDF had a weight ratio of 30:70) was dip coated on the cathode plate, and then baked at 140° C. for 30 minutes to form a composite film having a thickness of 0.4 μm to 0.5 μm.

The anode plate, the cathode plate with the composite film coated thereon, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 2.08Ω. The thin cell was formatted by charge/discharge cycles of 0.1 C/0.1 C to measure its electrical properties and irreversible capacitance, as tabulated in Table 3. The thin cell had a poorer performance with a higher irreversible capacitance in the first and second charge/discharge cycles, and the thin cell had a better performance with a higher charge capacitance in the third charge.

TABLE 3

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 9.2% | 5.8% | 141.26 |
| $2^{nd}$ experiment | 22.3% | 5.0% | 123.83 |
| $3^{rd}$ experiment | 13.1% | 1.2% | 143.77 |
| Average | 14.9% | 4.0% | 136.29 |

Example 8

The composite coating having a solid content of 8.0 wt % in Example 1 (the lithium ion exchange clay and the PVDF had a weight ratio of 30:70) was dip coated on the cathode plate, and then baked at 140° C. for 30 minutes to form a composite film having a thickness of 0.8 μm to 0.9 μm.

The anode plate, the cathode plate with the composite film coated thereon, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 6.79Ω. The thin cell was formatted by charge/discharge cycles of 0.1 C/0.1 C to measure its electrical properties and irreversible capacitance, as tabulated in Table 4. The thin cell had a poorer performance with a higher irreversible capacitance in the first and second charge/discharge cycles, and the thin cell had a better performance with a higher charge capacitance in the third charge.

TABLE 4

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 25.3% | 5.2% | 116.31 |
| $2^{nd}$ experiment | 24.3% | 5.4% | 120.95 |
| Average | 24.8% | 5.3% | 118.63 |

Example 9

The composite coating having a solid content of 3.0 wt % in Example 1 (the lithium ion exchange clay and the PVDF had a weight ratio of 30:70) was dip coated on the anode plate, and then baked at 140° C. for 30 minutes to form a composite film having a thickness of less than 0.1 μm.

The anode plate with the composite film coated thereon, the cathode plate, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.08Ω.

The thin cell was formatted by charge/discharge cycles of 0.1 C/0.1 C to measure its electrical properties and irreversible capacitance, as tabulated in Table 5. The thin cell had a poorer performance with a higher irreversible capacitance in the first and second charge/discharge cycles, and the thin cell had a better performance with a higher charge capacitance in the third charge.

TABLE 5

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 8.2% | 6.6% | 140.74 |
| $2^{nd}$ experiment | 13.3% | 1.6% | 137.27 |
| Average | 10.8% | 4.1% | 139.01 |

Example 10

The composite coating having a solid content of 5.7 wt % in Example 1 (the lithium ion exchange clay and the PVDF had a weight ratio of 30:70) was dip coated on the anode plate, and then baked at 140° C. for 30 minutes to form a composite film having a thickness of 0.3 μm to 0.4 μm.

The anode plate with the composite film coated thereon, the cathode plate, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.38Ω. The thin cell was formatted by charge/discharge cycles of 0.1 C/0.1 C to measure its electrical properties and irreversible capacitance, as tabulated in Table 6. The thin cell had a poorer performance with a higher irreversible capacitance in the first and second charge/discharge cycles, and the thin cell had a better performance with a higher charge capacitance in the third charge.

TABLE 6

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 12.9% | 1.0% | 138.35 |
| $2^{nd}$ experiment | 13.1% | 1.5% | 139.54 |
| $3^{rd}$ experiment | 13.9% | 1.9% | 140.93 |
| Average | 13.3% | 1.5% | 139.61 |

Example 11

The composite coating having a solid content of 8.0 wt % in Example 1 (the lithium ion exchange clay and the PVDF had a weight ratio of 30:70) was dip coated on the anode plate, and then baked at 140° C. for 30 minutes to form a composite film having a thickness of 0.8 μm to 0.9 μm.

The anode plate with the composite film coated thereon, the cathode plate, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.57Ω. The thin cell was formatted by charge/discharge cycles of 0.1 C/0.1 C to measure its electrical properties and irreversible capacitance, as tabulated in Table 7. The thin cell had a poorer property with a higher irreversible capacitance in the first and second charge/discharge cycles, and the thin cell had a better property with a higher charge capacitance in the third charge. As shown in a cell impedance comparisons between the cathode plates with the composite films coated thereon in Examples 6-8 and the anode plates with the composite films coated thereon in Examples 9-11, the composite film was preferably disposed between the anode plate and the separator to reach a lower cell impedance.

TABLE 7

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 14.2% | 2.0% | 138.35 |
| $2^{nd}$ experiment | 9.4% | 5.6% | 138.02 |
| Average | 11.8% | 3.8% | 138.18 |

Example 12

The composite coating having a solid content of 1.2 wt % in Example 1 (the lithium ion exchange clay and the PVDF had a weight ratio of 80:20) was dip coated on the anode plate, and then baked at 140° C. for 30 minutes to form a composite film having a thickness of less than 0.1 μm.

The anode plate with the composite film coated thereon, the cathode plate, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 2.16Ω. The thin cell was formatted by charge/discharge cycles of 0.1 C/0.1 C to measure its electrical properties and irreversible capacitance, as tabulated in Table 8. The thin cell had a poorer performance with a higher irreversible capacitance in the first and second charge/discharge cycles, and the thin cell had a better performance with a higher charge capacitance in the third charge.

TABLE 8

| Cell | $1^{st}$ charge/discharge cycle (0.1 C/0.1 C) Irreversible capacitance (%) | $2^{nd}$ charge/discharge cycle (0.1 C/0.1 C) Irreversible capacitance (%) | $3^{rd}$ Charge (0.1 C) Charge capacitance (mAh/g) |
|---|---|---|---|
| $1^{st}$ experiment | 26.5% | 4.5% | 116.01 |
| $2^{nd}$ experiment | 25.0% | 4.0% | 116.82 |

TABLE 8-continued

| Cell | 1st charge/discharge cycle (0.1 C/0.1 C) Irreversible capacitance (%) | 2nd charge/discharge cycle (0.1 C/0.1 C) Irreversible capacitance (%) | 3rd Charge (0.1 C) Charge capacitance (mAh/g) |
|---|---|---|---|
| 3rd experiment | 28.1% | 3.8% | 110.06 |
| Average | 26.5% | 4.1% | 114.30 |

Example 13

The composite coating having a solid content of 8.0 wt % in Example 1 (the lithium ion exchange clay and the PVDF had a weight ratio of 30:70) was dip coated on a polyethylene separator (N9620, commercially available from Asahi), and then baked at 80° C. for 30 minutes to form a composite film on the separator surface. The separator with the composite film coated thereon was cut to a size of 3 cm×3 cm. Another polyethylene separator (N9620, commercially available from Asahi) was cut to 3 cm×3 cm. The cut polyethylene separator and the cut polyethylene separator with the composite film coated thereon were baked at 140° C. for 1 hour. As seen by eyes, the separator with the composite film coated thereon retained original shape after baking, and the commercially available separator dramatically deformed after baking. Accordingly, the composite film could help the separator to retain its original shape at high temperature. In other words, the composite films coated on the separator might efficiently solve the deformation problem of the separator at high temperatures, thereby preventing an internal short-circuit from occurring due to the anode plate contacting the cathode plate.

Although the cell impedance in Comparative example 1 was lower than that in Examples 6-12, the polyethylene separator was thermally unstable as shown in Example 13. The polypropylene separator operated at a high temperature for a long period deforms and contracts, such that the internal short-circuit problem occurs.

Example 14

47 g of clay (Montmorillonite clay PK-805, commercially available from Paikong, clay size>1 μm), 180 g of the 18 wt % PVDF solution of DMAc in Example 1, and 800 g of DMAc were averagely mixed, and the mixture was supersonic vibrated for 1 hour to form a composite coating. The composite coating had a solid content of 7.4 wt %, wherein the lithium ion exchange clay and the PVDF had a weight ratio of 60:40.

The described composite coating having a solid content of 7.4 wt % (the lithium ion exchange clay and the PVDF had a weight ratio of 60:40) was dip coated on the cathode plate, and then baked at 140° C. for 30 minutes to form a composite film having a thickness of less than 0.1 μm.

The anode plate, the cathode plate with the composite film coated thereon, and a polyethylene separator (N9620, commercially available from Asahi) were assembled to form an electrode assembly (50 mm×40 mm×1.5 mm). An electrolyte was added into the electrode assembly and then sealed to form a thin cell of aluminum foil bag. The electrolyte had an organic solvent of ethylene carbonate (EC)/diethylene carbonate (DEC)/propylene carbonate (PC) having a ratio of 2:3:5, and a lithium salt $LiPF_6$ (1.1M) was dissolved in the organic solvent. The completed thin cell was kept still for 8 hours, and then measured by an alternating-current impedance analyzer of 1 kHz to obtain the cell impedance of 1.17Ω. The thin cell was formatted by charge/discharge cycles of 0.1 C/0.1 C to measure its electrical properties and irreversible capacitance, as tabulated in Table 9. The thin cell had a poorer performance with a higher irreversible capacitance in the first and second charge/discharge cycles, and the thin cell had a better performance with a higher charge capacitance in the third charge.

TABLE 9

| Cell | 1st charge/discharge cycle (0.1 C/0.1 C) Irreversible capacitance (%) | 2nd charge/discharge cycle (0.1 C/0.1 C) Irreversible capacitance (%) | 3rd Charge (0.1 C) Charge capacitance (mAh/g) |
|---|---|---|---|
| 1st experiment | 15.1 | 2.0 | 137.56 |
| 2nd experiment | 15.0 | 2.0 | 136.66 |
| 3rd experiment | 14.8 | 1.6 | 136.76 |
| Average | 15.0 | 1.9 | 136.99 |

Example 15

Cycle Lifetime Test

Figure 4:
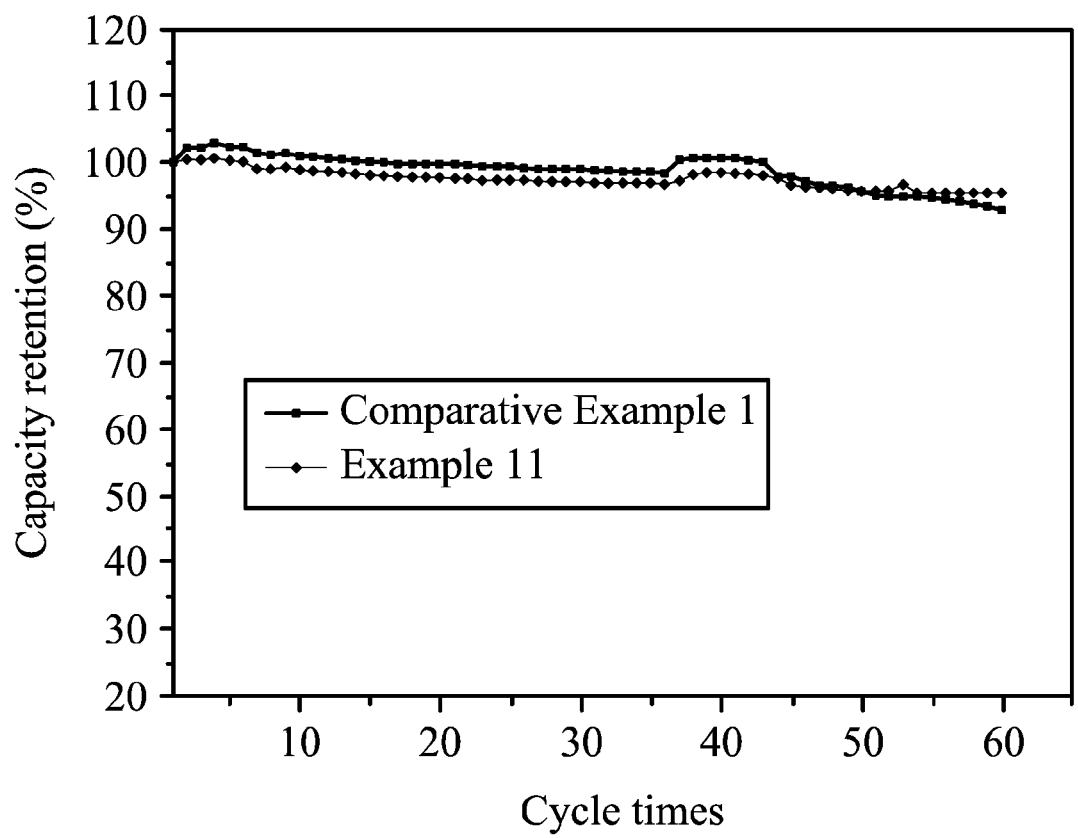
FIG. 4 shows a cycle lifetime comparison of the Example and Comparative example in the disclosure.

The cells in Example 11 and Comparative example 1 were charged to 4.2V by a current of 0.2 C at room temperature (25° C.), and then discharged to 3V by a current of 0.2 C, respectively, as shown in FIG. 4. The cells in Example 11 and Comparative example 1 had a capacity retention difference of only 2.7% after 60 charge/discharge cycles. Because the inorganic clay particles helped a stable SEI film form on the anode plate surface, the anode plate with the composite film formed thereon as shown in Example 11 would not significantly influence the cell cycle lifetime.

Example 16

Charge/Discharge Rate Test

Figure 5:
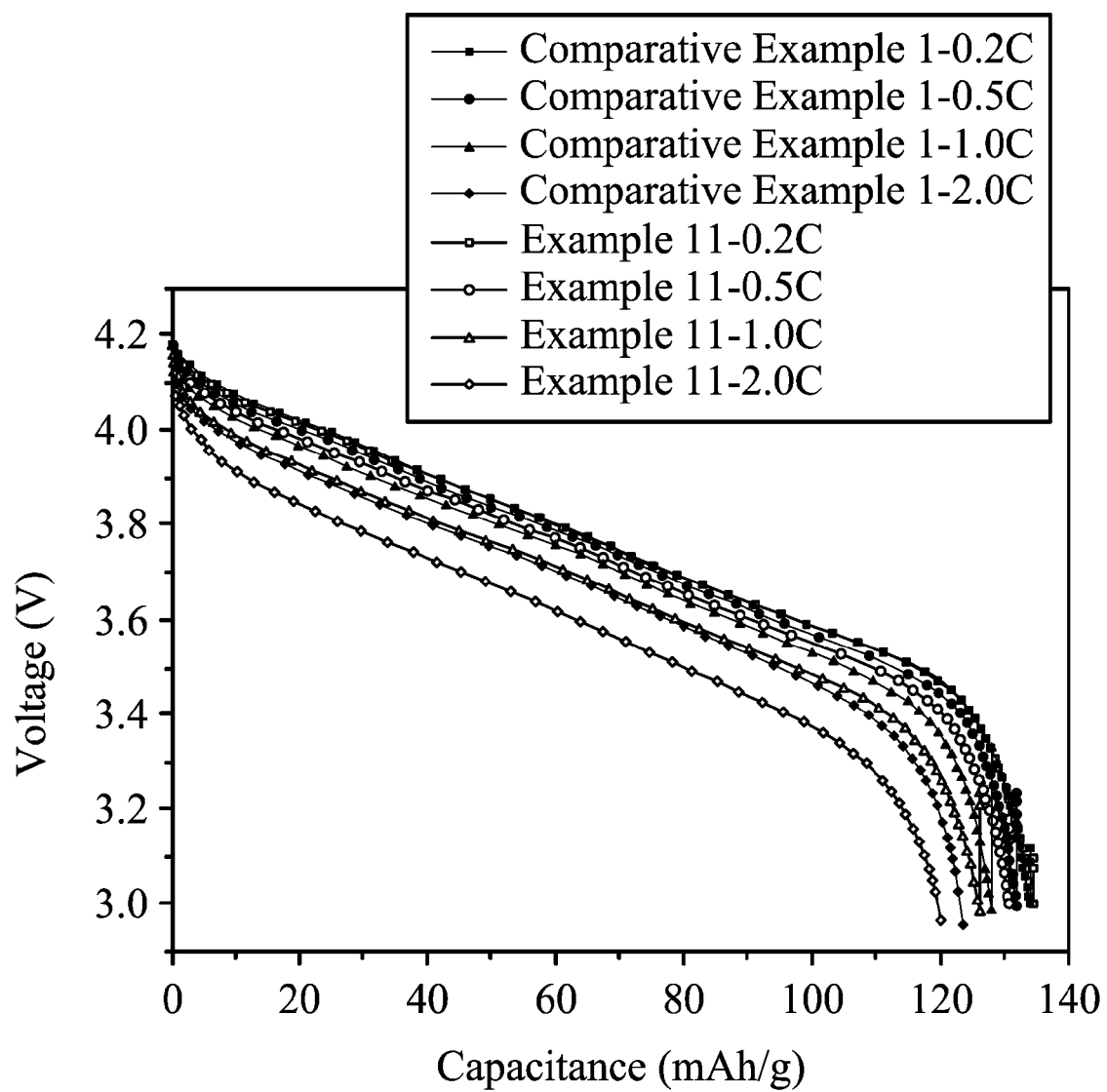
FIG. 5 shows a charge/discharge rate comparison of the Example and Comparative example in the disclosure.

The cells in Example 11 and Comparative example 1 were charged to 4.2V by a current of 0.2 C, and then discharged to 3V by different currents of 0.2 C, 0.5 C, 1 C, and 2 C, respectively, to compare the discharge capacity retentions at different discharge rates as shown in FIG. 5 and Table 10. The charge/discharge rate test shows that the cells in Comparative example 1 and Example 11 had a similar discharge capacitance (about 134 mAh/g). Because the lithium ion conduction speed was limited, both of the cells in Comparative example 1 and Example 11 had lower discharge capacity retention when the discharge rate was enhanced. Although the anode surface in Example 11 had a non-conductive material, the cells in Example 11 and Comparative example 1 had a capacity retention difference of only 2.3% under a higher discharge rate of 2 C. Because the inorganic clay particles might restrain the anions from conduction and accelerate the lithium ion conduction, the anode plate with the composite film formed thereon in Example 11 would not significantly influence the cell cycle lifetime.

TABLE 10

|  | Discharge rate | 1st sample | | 2nd sample | | 3rd sample | | Average discharge capacity retention |
|---|---|---|---|---|---|---|---|---|
|  |  | Discharge capacitance (mAh/g) | Discharge capacity retention (vs. 0.2 C) | Discharge capacitance (mAh/g) | Discharge capacity retention (vs. 0.2 C) | Discharge capacitance (mAh/g) | Discharge capacity retention (vs. 0.2 C) |  |
| Comparative Example 1 | 0.2 C | 134.02 | 100.0% | 134.12 | 100.0% | — | — | 100.0% |
|  | 0.5 C | 131.9 | 98.4% | 132.96 | 99.1% | — | — | 98.8% |
|  | 1 C | 127.87 | 95.4% | 128.87 | 96.1% | — | — | 95.7% |
|  | 2 C | 123.51 | 92.2% | 123.76 | 92.3% | — | — | 92.2% |
| Example 11 | 0.2 C | 134.5 | 100.0% | 132.68 | 100.0% | 136.89 | 100.0% | 100.0% |
|  | 0.5 C | 130.83 | 97.3% | 128.83 | 97.1% | 134.02 | 97.9% | 97.4% |
|  | 1 C | 126.07 | 93.7% | 124.49 | 93.8% | 128.88 | 94.1% | 93.9% |
|  | 2 C | 120.15 | 89.3% | 119.07 | 89.7% | 123.95 | 90.5% | 89.9% |

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrode assembly of a lithium secondary battery, comprising:
    an anode plate;
    a cathode plate;
    a separator for separating the anode plate and the cathode plate and conducting lithium ions of an electrolyte; and
    a composite film disposed between the anode plate and the separator and/or between the plate and the separator,
    wherein the composite film includes 5 to 90 parts by weight of an inorganic clay and 95 to 10 parts by weight of an organic polymer binder, wherein the inorganic clay is lithium ion exchange clay, and
    wherein the lithium ion exchange clay is lithium ion exchange montmorillonite clay.

2. The electrode assembly of a lithium secondary battery as claimed in claim 1, wherein the organic polymer binder includes a fluorinated polyethylene.

3. The electrode assembly of a lithium secondary battery as claimed in claim 1, wherein the composite film has a thickness of 0.1 µm to 10 µm.

4. The electrode assembly of a lithium secondary battery as claimed in claim 1, wherein the anode plate and the cathode plate comprises a current collector material and an electrode active material particle.

5. The electrode assembly of a lithium secondary battery as claimed in claim 1, wherein the separator comprises polyolefin.

6. The electrode assembly of a lithium secondary battery as claimed in claim 1, wherein the composite film is a coating of a mixture of a lithium ion solution, a solution of the inorganic clay, and the organic polymer binder.

* * * * *